May 23, 1950     J. B. COX     2,508,784
POWER SAW CHAIN

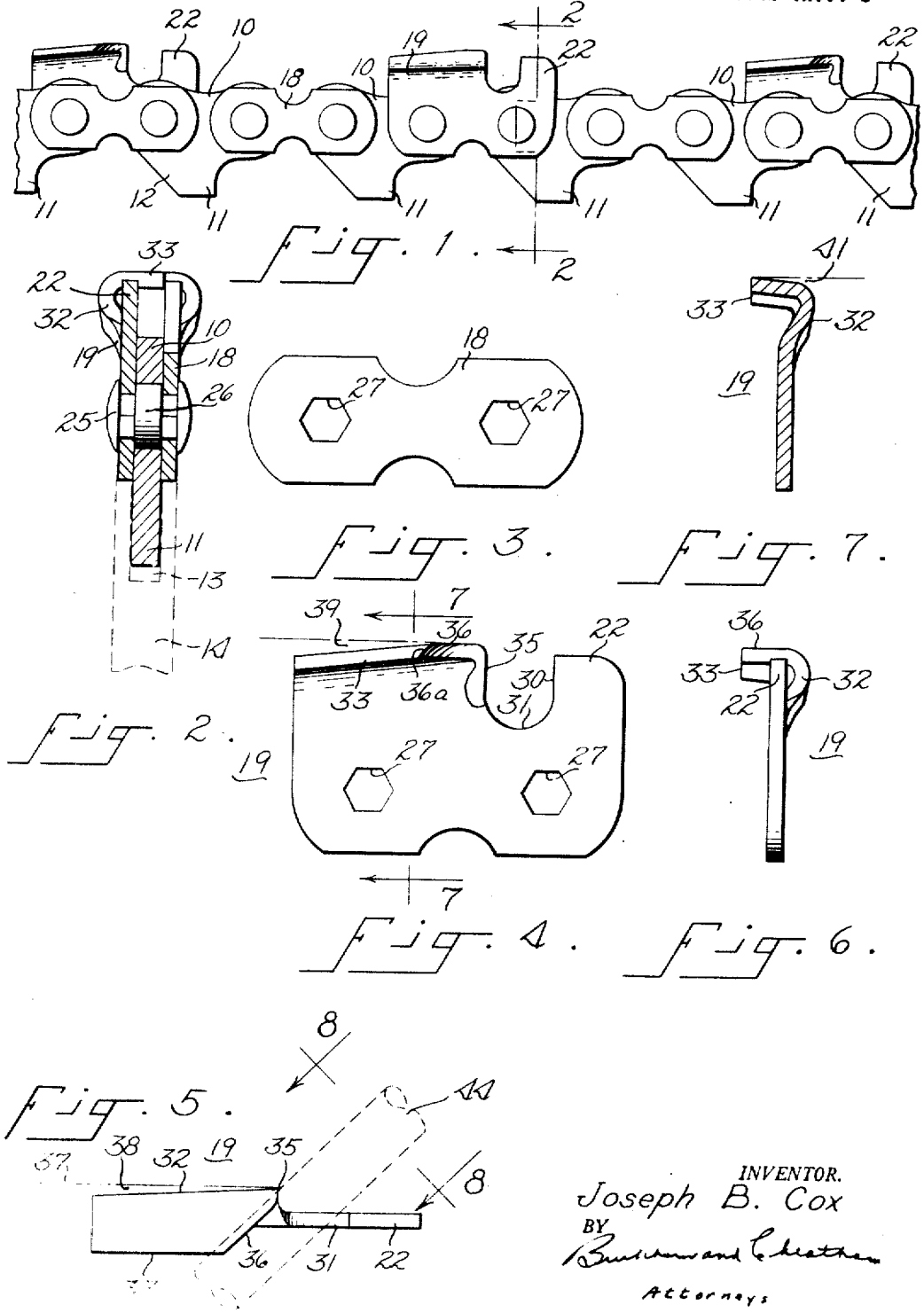

Filed Nov. 13, 1948     2 Sheets-Sheet 2

INVENTOR.
Joseph B. Cox
BY
Attorneys

Patented May 23, 1950

2,508,784

UNITED STATES PATENT OFFICE 2,508,784

POWER SAW CHAIN

Joseph B. Cox, Portland, Oreg., assignor to Oregon Saw Chain Mfg. Corp., Portland, Oreg., a corporation of Oregon Application November 13, 1948, Serial No. 59,941

9 Claims. (Cl. 143—135)

This invention relates to saw chains particularly adapted for cutting wood.

The principal object of this invention is to provide a new and improved saw chain which has a smoother and more efficient cutting action than saw chains as provided heretofore. Saw chains of the prior art are usually provided with side cutting, or slitting, teeth alternating with separate raker teeth and are characterized by a jerky operation due to the fact that, when freshly sharpened, the cutter teeth, in working through the wood, tend to gouge into the wood and, upon reaching the limit of lateral outward movement, tear free from the wood and spring back toward the median plane of the saw. As the teeth bite into the wood again, the same action is repeated. This rapidly alternating gouging and tearing action imposes a severe strain upon the cutting edges of the cutter teeth with the result that they are quickly dulled. As the teeth become dull, the gouging action is diminished, whereupon the teeth fail to cut a kerf of proper width, and the opposite cutter teeth are crowded in toward the median plane of the saw. This results in a binding of the saw chain in the kerf and necessitates resharpening of the chain.

In attempts made by others to improve the stability of the saw chains, the shape of the teeth and their arrangement upon the links have been varied with little or no real improvement in cutting action. Thus, for example, cutting teeth have been made in the form of a knife blade, others in an L-shape, and others with a C-shape. The basic defect common to all of the saw chains of the prior art, including those having the different shapes referred to, is that the cutting edge, or substantially all thereof, is offset to one side only of the plane of the chain link on which it is formed. This means that the load, due to cutting action through the wood, is unbalanced with respect to the plane of the base plate, and, due to the bevel of the cutting edge portion of the tooth, when the edge is sharp, the tooth tends to gouge outwardly in the direction of the offset while, when the edge is dull, the tooth is crowded away from the kerf side wall and in the direction opposite to the offset. Thus with a cutting tooth of a saw chain having the cutting edge portion substantially offset to one side of the plane of the tooth base plate it is fundamentally inherent for the chain to be rough or jerky in operation when sharp and to bind when dull.

In accordance with the present invention, I provide a saw chain in which the cutting edge of each tooth extends for substantially equal distances on opposite sides of the plane of the base plate so that the load during cutting operation of the tooth is substantially balanced upon the opposite sides of the central plane of the tooth plate. By so balancing the tooth load, the teeth are each fully stabilized with the result that alternate outward gouging and inward tearing, or jerkiness in operation, are substantially eliminated. This results in longer chain life, a uniform kerf width whether the chain is sharp or dull, little or no tendency to bind, an increase in the length of time between sharpening operations, and a very substantial increase in cutting speed. More specifically, therefore, it is an object of the present invention to provide a new and improved saw chain in which each cutting tooth is of such configuration and the cutting edge so formed thereon that the load during the cutting operation is substantially balanced on the opposite sides of the median plane of the base plate of the tooth.

A further object of the present invention is to provide a saw chain which will result in decreased wear of the supporting saw bar.

Another object of the invention is to provide a saw chain having only one form of a cutter or wood removing tooth, alternate teeth being of right and left configuration.

A still further object of the invention is to provide a saw chain which is capable of inexpensive manufacture and which is accomplished by the provision of link elements, all of which may be stamped from blank stock and being of a minimum number of different shapes.

And a further object of the invention is to provide a new and improved saw chain in which the cutting edges of the teeth may readily be resharpened by the user by a simple operation and with a single round file held in one filing position. A still further object is to provide a new and improved saw chain in which the cutting edge of the teeth is located relatively closely adjacent to the line of pull through the link pins thereby adding considerably to the stability of the saw.

These and further objects and advantages of the invention will become apparent as the following description proceeds while the specific features of novelty will be pointed out with greater particularity in the appended claims forming a part of the specification.

In the drawings, Fig. 1 is a side elevation of a saw chain constructed in accordance with one form of the present invention;

Fig. 2 is a cross-sectional view taken along the line 2—2 of Fig. 1;

Fig. 3 is a side elevation illustrating a side plate incorporated in the saw chain of Fig. 1;

Fig. 4 is a side elevation of a tooth plate incorporated in the saw chain of Fig. 1;

Fig. 5 is a top plan view of the tooth plate shown in Fig. 4;

Fig. 6 is a front elevation of the tooth plate shown in Fig. 4;

Fig. 7 is a cross-sectional view taken along line 7—7 of Fig. 4;

Figure 9:
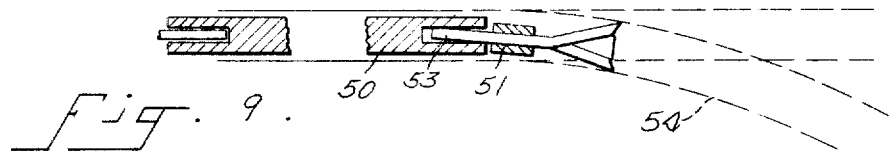
Figs. 9 and 10 are comparative diagrammatic views illustrating certain features of the present saw chain as against saw chains of the prior art.

Referring to Fig. 1, the chain of the invention consists of a plurality of centrally disposed links 10, longitudinally spaced apart and having sprocket engaging root portions 11 depending from the lower edge thereof, the rear edge 12 of the root portion 11 sloping at an angle corresponding to the angle of the faces of the driving sprocket teeth (not shown). It will be understood that the root portions 11 of the links 10 ride within the groove 13 of the saw bar indicated generally at 14 in Fig. 2. The links 10 are pivotally joined together by means of pairs of oppositely disposed side plates 18 and 19. The side plates 18 are identical with each other and one is shown in greater detail in Fig. 3. The side plate 19 has a hook-shaped tooth formed on the upper end thereof and is provided with a depth gauge ahead of the tooth. Alternate tooth plates 19 are of right and left configuration for reasons as will subsequently appear. In the description following, only one of the teeth will be described in detail, the description being fully applicable in all respects to both right and left teeth.

Referring now to the enlarged view of Fig. 2, the central link and side plate elements are pivotally connected together by means of pivot pins 25, the central portion of the pivot pins being provided with an enlarged annular shoulder 26 having a width very slightly greater than the thickness of the central link member 10 and a diameter slightly less than the cooperating opening provided therein so that the link member 10 may pivot freely thereabout. The opposite side plate members, as illustrated in Figs. 3, 4 and 5 are provided with hexagonal openings 27 for cooperatively receiving the opposite ends of the pivot pins 25. As the ends of the pins 25 are spun over, the metal thereof is expanded so as to fill completely the corners of the hexagonal holes 27 whereby the opposite side plates are permanently and rigidly fixed with respect to each other against the shoulders provided by the enlarged intermediate pin portion 26. Working of the chain will thus not result in a loosening of the side plates upon the pins 25 and no wear can take place therebetween, and thus lateral play between successive links of the chain is held to a minimum.

Referring now to Figs. 2, 4, 5, 6, and 7, the side plate 19 having the cutting tooth formed thereon will now be described in greater detail. The depth gauge 22 is formed at the forward end of the plate 19, the rear edge 30 of the depth gauge being spaced from the forward edge of the cutting tooth by the arcuate recess 31. The upper end of the plate 19 is first bent laterally outwardly in the direction opposite the central link elements 10 and which reversely curved laterally extending portion 32 is for convenience hereinafter referred to as the shank portion of the tooth. The upper, free end portion of the plate is then bent back over the top of the central link 10 and in a direction substantially at right angles with respect to the plane of the plate 19 so as to define the toe portion 33 of the tooth. As shown, the shank portion 32 is curved reversely with respect to the plane of the plate 19 while the toe portion 33 is tangential with respect to the upper end of the curved shank portion 32. The forward edge of the shank and toe portions is provided with a chisel edge, the chisel edge of the shank portion 32, as shown at 35 in Fig. 4, is substantially at right angles with respect to the longitudinal direction of the plate 19 while the edge 36 of the toe portion extends at an angle of substantially 45° with respect to the longitudinal direction of plate 19, as shown more clearly in Fig. 5.

As illustrated in the view of Fig. 5 in which the line 37 illustrates the side wall of the saw kerf in the wood, the shank portion 32 of the tooth is tapered inwardly toward the rear end of the plate 19, the angle of taper being indicated at 38. Moreover the toe portion 33 of the tooth is tapered downwardly toward the rear end of the plate 19 as indicated by the angle 39 in Fig. 4. As illustrated best in the sectional view of Fig. 7, the toe portion 33 is also actually tapered slightly downwardly toward the shank portion 32 as indicated by the angle 41. Due to the angles 39 and 41, the cutting edge 36 of the toe portion as illustrated in the front elevational view of Fig. 6 extends substantially in a horizontal plane or in a plane at right angles with respect to the plane of the plate 19.

Figure 8:
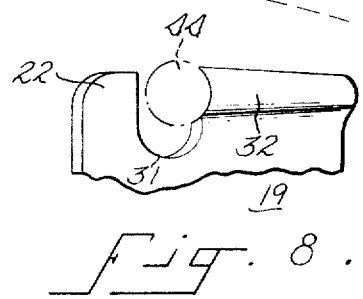
Fig. 8 is a fragmentary view in perspective taken along the line 8—8 of Fig. 5.

An important feature of the present invention resides in the fact that the cutting edge 36—35 of the toe and shank portions of the teeth may be sharpened by means of a cylindrical round file as indicated by the views of Figs. 5 and 8. Referring to Fig. 5, a round file is indicated at 44 and which may be inserted into the recess opening 31 between the depth gauge 22 and the adjacent forward edge of the tooth, the width of the recess 31 being purposely somewhat greater than the necessary diameter for the file 44. The curvature of the shank portion 32 of the tooth is such that, when the file is held at a 45° angle with respect to the plane of the plate 19, the bevelled surface of the cutting edge will conform to and fit snugly against the surface of the file 44. A straight bevel surface is thereby provided upon the shank portion 32, the surface being parallel with the longitudinal axis of the file, while the edge of the toe portion 33 will be hollow ground as indicated at 36a in Fig. 4 due to the curvature of the surface of the file and which extends in a direction parallel with the toe portion of the tooth. The cutting edge thus formed is very efficient inasmuch as a stronger edge is provided on the shank portion where it is required to cut through the wood crosswise to the grain while the thin, hollow ground edge 36 of the toe is particularly suitable for slicing through the wood at the bottom of the kerf in a direction parallel with the wood grain. Hence this tooth cuts the kerf both side and bottom simultaneously, thereby eliminating the necessity for separate cutting and routing teeth.

Particular attention is directed to the fact that the toe portion 33 extends on the opposite side of the plate 19 with respect to the reversely curved portion 32 but substantially the same distance as the shank portion 32 so that, during cutting operation of the tooth through wood, the load impressed upon the tooth is substantially balanced on opposite sides of the central plane of the plate 19. Thus, as the saw is driven through the wood, each cutting tooth exhibits no tendency to jerk laterally of the longitudinal direction of the chain. There will be a slight, continuous outward pressure due to the 45° angularity of the cutting edge 36 of the toe portion of the tooth, but this is not sufficient to cause sporadic lateral gouging of the cutting edge 35 of the shank portion into the kerf side wall as is characteristic of saw chains of the prior art.

While stability of the cutter links of the saw chain of the present invention is enhanced by balancing the cutting load on opposite sides of the tooth plate, an additional factor contributing to the stability of the saw is that the cutting edge is maintained closed to the supporting saw bar. Attention is directed to the fact that the shank portion 32 curves outwardly from the plane of the plate 19 immediately adjacent the upper edge of the central links 10. Moreover the reverse curve of the shank portion 32 is purposely made relatively sharp, the internal radius of curvature between the shank portion 32 and the toe portion 33 being of the order of $\tfrac{1}{32}$ inch so that the toe portion extends relatively closely adjacent the upper edge of the central links 10. As illustrated in Fig. 2, the length of the cutter teeth, as measured from the pivot pin, is substantially equal to the length of the roots 11. The importance of this feature is best illustrated in Figs. 9 and 10.

Referring to Fig. 9, a saw bar is illustrated at 50 having a conventional chain 51 mounted in the track thereof. As is well known by those skilled in the art, a certain play must inherently exist between the roots 53 of the saw chain and the groove of the saw bar and the saw chain will rock laterally within the limits of such play. During normal cutting operation, such as in felling a tree, rocking of the chain will result in the chain cutting a kerf which is curved as indicated by the dotted lines 54. The angle of curvature is frequently so great that the saw bar 50, due to its width, cannot follow through it with the result that, as the bar passes into the curved portion of the kerf, the roots 53 of the chain 51 are urged with such pressure against one of the side walls of the saw bar groove that excessive wear occurs even to the extent that, in some instances, the roots of the teeth as well as the groove flanges of the saw bar become badly burned due to frictional heating.

Figure 10:
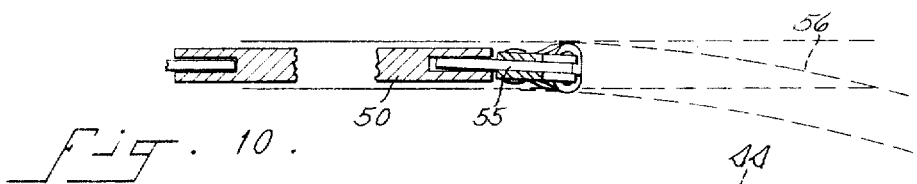

Referring to Fig. 10, in the case of a saw chain 55 constructed in accordance with the present invention, because of the fact that the teeth are relatively short, as compared with the length of conventional saw chain teeth, the same lateral rocking movement of the chain upon the edge of the saw bar will result in a much smaller degree of deflection of the outer ends of the teeth so that, instead of forming a relatively sharply curved kerf as indicated at 54 in Fig. 9, the maximum possible curvature resulting from the usage of the present chain is indicated by the curved kerf 56. The angle of curvature of this kerf 56 is so slight as compared with the width of the saw bar 50 that the saw bar can readily follow behind the saw through the kerf without causing any binding action upon the saw or between the saw and the supporting bar groove. I have found that, if the lengths of the teeth and of the link roots, as measured from the pivot pins of the links, are substantially equal, the maximum possible angle of curvature which may be cut will be well within the permissible range of any saw bar now in common usage.

Figure 11:
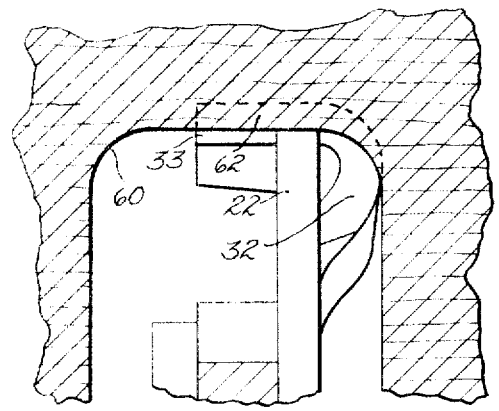
Fig. 11 is an enlarged fragmentary view illustrating a further feature of the saw chain of the invention.

A further feature of the invention resides in the fact that the tooth portion between the shank and the toe is rounded whereby rounded corners 60 are formed in the kerf 61 as illustrated in Fig. 11. During normal cutting operation, the depth gauge 22 will ride against the bottom of the kerf in the flat portion thereof but next adjacent the curved portion. In this position of the depth gauge, the tooth will cut a proper slice of wood as indicated by the portion 62. Now if, because of play in the tooth linkage or any other reason, the cutting edge of the shank portion 32 should have a tendency to shift laterally outwardly, or to the right as viewed in Fig. 11, the depth gauge would ride up on the slope of the rounded corner and withdraw the cutting edge somewhat from the wood and thus create a resistance countering the tendency of outward movement of the tooth. The tooth is thereby substantially and automatically retained in its proper path of travel.

It is also pointed out that because the tooth portion between the shank and the toe is rounded, the side wall surfaces of the kerf will be smooth due to circular overlapping of successive cuts. It will be obvious that in the case of teeth having a sharp or pointed corner at the outer lateral extremity, the kerf side walls formed thereby are rough and jagged.

Figure 12:
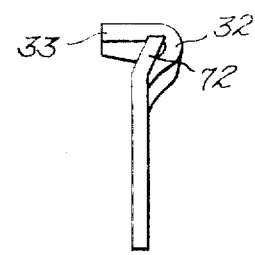
Fig. 12 is a front elevation illustrating a saw chain link according to a further modification of the invention.

In the front elevational view of Fig. 12 is illustrated a modified form of cutter link, it being distinguished from that previously described in that the upper end portion 72 of the depth gauge is offset laterally at an angle in the direction of the shank portion 32 of the tooth. Referring back to Fig. 11, it will be observed that the upper end of the depth gauge portion 22 rides wholly against the flat bottom portion of the kerf ahead of the cutting edge of the tooth and some lateral movement of the tooth to the right, as viewed in Fig. 11, is permissible before a substantial portion of the end of the depth gauge engages with the curved corner surface of the kerf. With the upper end of the depth gauge bent outwardly at a slight angle as indicated at 72 in Fig. 12, the upper end thereof will be more effective in restricting the lateral outward movement of the tooth for the reason that the upper right corner of the depth gauge, as viewed in Fig. 12, will normally ride upon the edge of the curved kerf portion. Any slight outward movement of the tooth will cause the upper end of the depth gauge 72 immediately to ride upwardly upon the curved corner portion at an increased rate to more effectively withdraw the tooth from the wood or to urge the same back toward the normal line of travel than in the case of the depth gauge 22.

Figure 13:
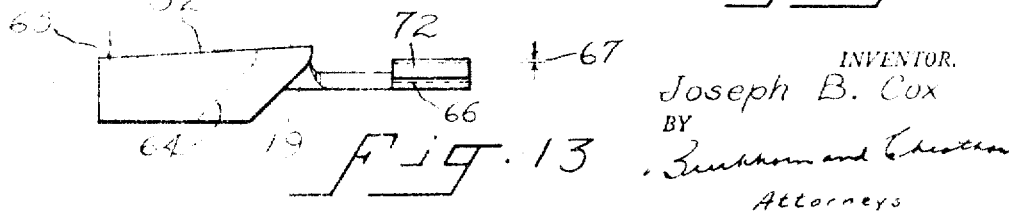
Fig. 13 is a top plan view of the link shown in Fig. 12.

An additional advantage resulting from angular offsetting of the depth gauge as shown in Fig. 12 is more clearly illustrated in the plan view of Fig. 13. By wear and by repeated sharpening of the link teeth, the forward or cutting edge is, in due course, worn back to some such line as indicated at 64. Due to the angular recession of the outer edge 32 of the tooth, the cutting edge 35 of the shank portion is shifted inwardly toward the plane of the link plate 19 by an amount indicated at 65. Referring to Fig. 4, it will also be observed that the toe portion 33 tapers downwardly toward the rear end of the tooth link by an angle 39. It follows, therefore, that, as the cutting edge is ground back to the line such as 64, the cutting edge is, therefore, lowered toward the saw bar. Due to the angularity of offset of the depth gauge portion 72, normal wear, with such supplemental filing as may be necessary, will result in shortening of the depth gauge portion 72 by an amount indicated by dotted lines 66 and which, in turn, will result in a recession of the outer corner of the depth gauge by an amount indicated at 67. With the depth gauge offset at an angle as indicated at 72, the proper relation between the upper outer corner of the depth gauge and the cutting edge of the tooth link may be maintained throughout the full usable life of the chain link.

Figure 14:
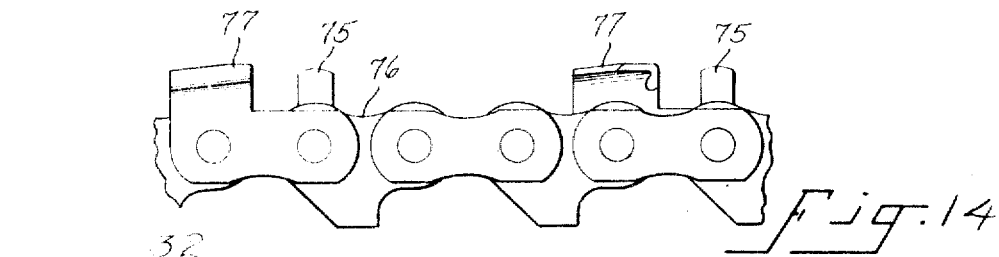
Fig. 14 is a side elevation illustrating a saw chain according to a further modification of the invention.

In the embodiments previously described, the depth gauge is provided integral with the forward end of the link plate on which the cutting tooth is formed. It is to be understood, however, that this is not essential inasmuch as the basic feature of the invention with respect to the balance tooth design is independent of the exact location of the depth gauge. In Fig. 14, for example, is illustrated a saw chain in which depth gauges 75 are provided upon the ends of the central link members 76 adjacent the forward ends of the cutter teeth elements 77. The cutter teeth elements 77 are the same as previously described without depth gauges being formed on the forward end portions of the base portions thereof.

In the foregoing description, the invention has been described with reference to certain particular preferred embodiments, though it is to be understood that the specific details shown are merely illustrative and that the invention may be carried out in other ways without departing from the true spirit and scope of the appended claims.

I claim:

1. In a saw chain, a pair of longitudinally spaced apart links including sprocket engaging root portions, a pair of oppositely disposed side plates pivotally joining said links together, one plate of said pair of side plates having a cutting tooth formed thereon and including an intermediate portion extending outwardly in the opposite direction with respect to said links and adjacent an edge thereof, the end portion of said plate extending back over said links substantially at right angles with respect to the plane of said plate, the forward edge of said intermediate and end portions being provided with a chisel cutting edge, the lateral extent of said chisel edge being substantially equal on opposite sides of said plate whereby the cutting load during working of said tooth is substantially balanced on the opposite sides of said one plate.

2. In a saw chain, a pair of longitudinally spaced apart links including sprocket engaging root portions, a pair of oppositely disposed side plates pivotally joining said links together, one plate of said pair of plates having a shank portion extending laterally outwardly in the opposite direction with respect to said links and adjacent an edge thereof, a toe portion integral with the end of said shank portion and extending substantially at right angles with respect to the plane of said plate, the forward edge of the said shank portion and said toe portion being provided with a chisel cutting edge, the lateral extent of said chisel edge being substantially the same on opposite sides of said plate.

3. In a saw chain having a pair of longitudinally spaced apart links including sprocket engaging portions and a pair of oppositely disposed side plates pivotally joining said links together, the invention comprising a cutting tooth formed on one of said side plates, said tooth including a shank portion and a toe portion, said shank portion extending laterally outwardly from said one plate in the direction opposite said links and said toe portion extending from said shank portion back over the edge of said plate and spaced therefrom, the forward edge of said shank and toe portions being provided with a continuous chisel cutting edge, said shank and toe portions extending laterally substantially equal distances from opposite sides of said plate, the beveled surface defining the cutting edge on said toe portion being concave and that defining the cutting edge on said shank portion being flat in the direction transversely of said surface.

4. In a saw chain having a pair of longitudinally spaced apart links including sprocket engaging portions and a pair of oppositely disposed side plates pivotally joining said links together, the invention comprising a cutting tooth formed on one of said side plates, said tooth including a reversely curved shank portion and a toe portion integral with the end of said shank portion, said shank portion extending laterally outwardly from said one plate in the direction opposite said links and said toe portion extending from said shank portion back over the edge of said plate at substantially right angles with respect thereto and spaced therefrom, the forward edge of said shank and toe portions being provided with a continuous chisel cutting edge, the bevelled edge surface defining the cutting edge on said toe and shank portions conforming to a cylindrical surface and with the axis of said cylindrical surface extending parallel with said toe portion, whereby said cutting edge may be resharpened throughout its full extent on both said shank and toe portion by a cylindrical round file reciprocated coaxially with said cylindrical surface.

5. In a saw chain having a pair of longitudinally spaced apart links including sprocket engaging portions and a pair of oppositely disposed side plates pivotally joining said links together, the invention comprising a cutting tooth formed on one of said side plates, said tooth including a shank portion and a toe portion, said shank portion being reversely curved and extending laterally outwardly from said one plate in the direction opposite said links and said toe portion extending from said shank portion back over the edge of said plate and spaced therefrom, the forward edge of said shank and toe portions being provided with a continuous chisel cutting edge, said shank and toe portion extending laterally substantially equal distances from opposite sides of said plate, the cutting edge of said shank portion terminating substantially in a first plane normal to the longitudinal direction of the chain, the cutting edge of said toe portion lying in a second plane at right angles to said first plane and extending at a substantially 45° angle with respect to the longitudinal direction of said chain, the beveled edge surface defining the cutting edge on said toe portion being concavely curved in the transverse direction.

6. In a saw chain, a link plate having a cutting tooth formed thereon, said tooth including a reversely curved shank portion and a toe portion extending tangentially from said shank portion substantially at right angles with respect to said plate, the forward edge of said shank and toe portions being provided with a bevelled surface forming a continuous chisel cutting edge on the forward extremity of said shank and toe portions, said bevelled surface of said shank and toe portions conforming to a cylindrical surface whereby said cutting edge may be resharpened throughout its full extent on both said shank and toe portions by a cylindrical round file reciprocated coaxially with said cylindrical surface.

7. In a saw chain having a pair of longitudinally spaced apart links including sprocket engaging portions and a pair of oppositely disposed side plates pivotally joining said links together, the invention comprising a cutting tooth formed on one of said side plates, said tooth including a reversely curved shank portion and a toe portion, said shank portion extending laterally outwardly from said one plate in the direction opposite said links and said toe portion extending tangentially from said shank portion back over the edge of said plate and spaced therefrom, the forward edge of said shank and toe portions being provided with a continuous bevelled chisel cutting edge, the bevel surface defining said cutting edge of said shank and toe portions conforming to a cylindrical surface, the axis of curvature of said cylindrical surface extending at a substantially 45° angle with respect to the plane of said plate whereby said cutting edge may be resharpened throughout its full extent on both said shank and toe portions by a cylindrical round file reciprocated coaxially with said cylindrical surface.

8. In a saw chain having a pair of longitudinally spaced apart links including sprocket engaging portions and a pair of oppositely disposed side plates pivotally joining said links together, the invention comprising a cutting tooth formed on one of said side plates, said tooth including a shank portion and a toe portion, said shank portion extending laterally outwardly from said one plate in the direction opposite said links, the lateral extent of said shank portion decreasing progressively rearwardly of said plate, said toe portion extending from said shank portion back over the edge of said one plate and spacer therefrom, a depth gauge integral with the forward end portion of said one plate, said depth gauge being offset angularly outwardly from said one plate but by an amount less than the lateral extent of said shank portion of said tooth, whereby the end of said depth gauge will recede laterally inwardly with wear simultaneously with the lateral inward recession of said shank portion due to wear.

9. In a saw chain, a link plate having a cutting tooth formed thereon, said tooth including a shank portion and a toe portion, said shank portion being reversely curved and extending laterally outwardly from said one plate and said toe portion being substantially flat and extending tangentially from said shank portion back over the edge of said plate and spaced therefrom, the forward edge of said shank and toe portions being provided with a bevel surface forming a continuous chisel cutting edge, said bevelled surface of said shank and toe portions conforming substantially to a cylindrical surface whereby said cutting edge may be resharpened throughout its full extent on both said shank and toe portions by a cylindrical round file, the cutting edge of said shank portion terminating substantially in a plane normal to the longitudinal direction of the chain.

JOSEPH B. COX.

REFERENCES CITED

The following references are of record in the file of this patent:

UNITED STATES PATENTS

| Number | Name | Date |
| --- | --- | --- |
| 279,781 | Magaw | June 19, 1883 |
| 485,503 | Lewis | Nov. 1, 1892 |
| 565,049 | Test | Aug. 4, 1896 |
| 591,039 | Harris | Oct. 5, 1897 |
| 815,256 | Bible et al. | Mar. 13, 1906 |
| 1,745,090 | Geithle | Jan. 28, 1930 |
| 1,937,073 | Stuve | Nov. 28, 1933 |
| 2,321,962 | Zandecki | June 15, 1943 |
| 2,326,854 | Hassler | Aug. 17, 1943 |
| 2,351,112 | Day | June 13, 1944 |

FOREIGN PATENTS

| Number | Country | Date |
| --- | --- | --- |
| 1,652 | Great Britain | Jan. 18, 1884 |
| 274,348 | Great Britain | July 21, 1927 |